United States Patent [19]
Vincenty

[11] 3,720,279
[45] March 13, 1973

[54] COMBUSTION AIR INTAKE SYSTEM FOR AN OFF-THE-ROAD VEHICLE

[75] Inventor: Henry Edward Vincenty, Willoughby Hills, Ohio

[73] Assignee: Euclid, Inc., Cleveland, Ohio

[22] Filed: Feb. 17, 1971

[21] Appl. No.: 115,987

[52] U.S. Cl. ..............................180/54 A, 180/66 A
[51] Int. Cl. ............................................B60k 13/02
[58] Field of Search ...180/54 A, 57, 54 F, 1 R, 66 A, 180/75; 115/1 R

[56] References Cited

UNITED STATES PATENTS

| 2,994,394 | 8/1961 | Underwood | 180/66 A |
|---|---|---|---|
| 2,095,344 | 10/1937 | Nelson | 180/54 F |
| 3,266,591 | 8/1966 | Sampietro et al. | 180/54 A |

FOREIGN PATENTS OR APPLICATIONS

| 775,638 | 5/1957 | Great Britain | 180/54 A |
|---|---|---|---|
| 420,616 | 4/1947 | Italy | 180/66 A |

Primary Examiner—Leo Friaglia
Assistant Examiner—Milton L. Smith
Attorney—Watts, Hoffmann, Fisher & Heinke

[57] ABSTRACT

An off-the-road dump truck is disclosed having a gas turbine engine located remote from the forward end of the truck and combustion air delivery ducts extending to the engine from the front of the truck. Each duct is supported and protected by a truck frame member and each duct is connected to an engine inlet port via a flexible connection between the duct and the engine.

11 Claims, 6 Drawing Figures

3,720,279

INVENTOR.
HENRY E. VINCENTY
BY Watts, Hoffmann,
Fisher & Henke
ATTORNEYS.

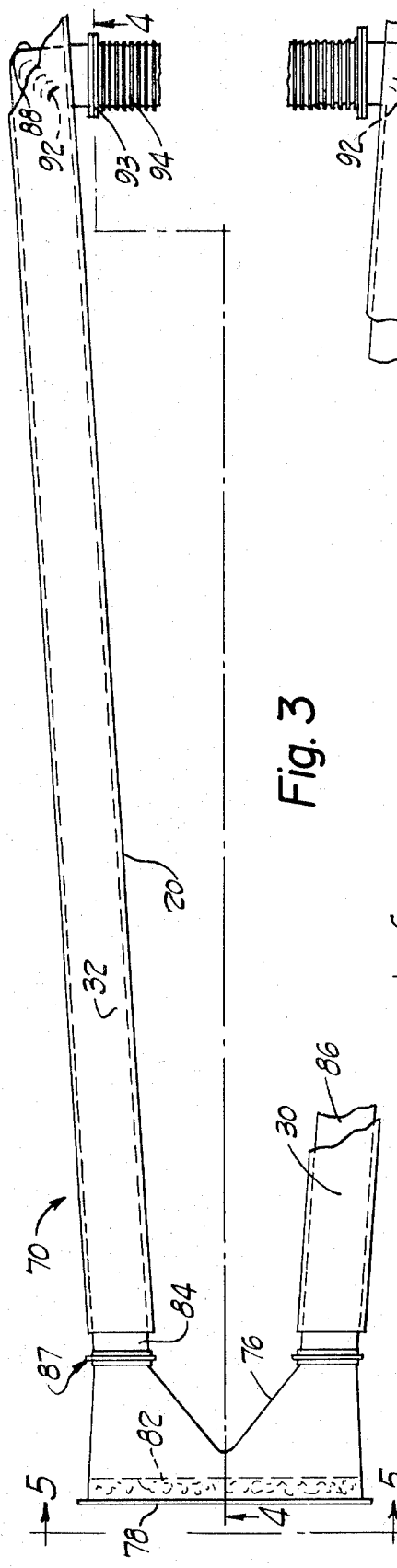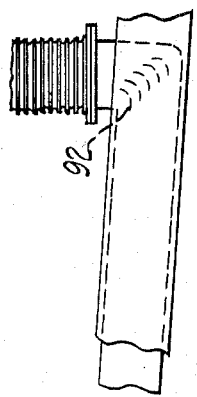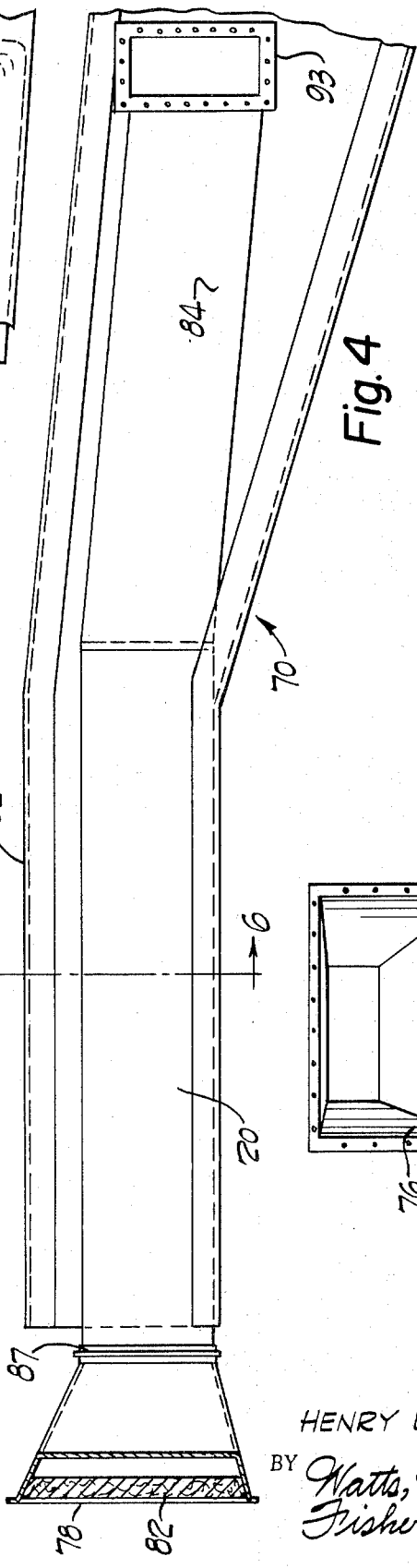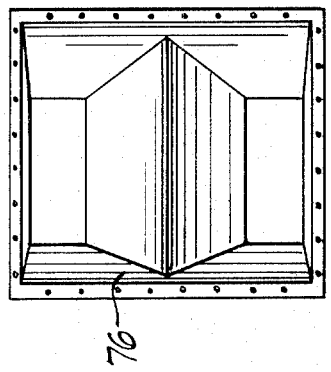

COMBUSTION AIR INTAKE SYSTEM FOR AN OFF-THE-ROAD VEHICLE

CROSS REFERENCED PATENT APPLICATIONS

U. S. Pat. application Ser. No. 115,480, filed Feb. 16, 1971 entitled REAR DUMPING VEHICLE by Douglas M. Kelley and assigned to the assignee of the application.

U. S. Pat. application Ser. No. 115,387, filed Feb. 16, 1971 entitled STEERABLE LOAD TRANSPORTING VEHICLE, by Douglas M. Kelley and assigned to the assignee of this application.

U. S. Pat. application Ser. No. 63,444, filed Aug. 13, 1970, entitled EXHAUST SYSTEM FOR A LOAD DUMPING VEHICLE, by Henry E. Vincenty and assigned to the assignee of this application.

BACKGROUND OF THE INVENTION

1. Field of the Invention

The present invention relates to vehicles having air breathing engines supported remote from the forward end of the vehicle and more particularly relates to such vehicles which are primarily used in off highway environments in which dust and dirt are likely to be ingested into the engine.

Engines located remote from the front end of vehicles have been exposed to dust and dirt thrown into the air by movement of the vehicle. Air cleaners have commonly been used to prevent dust and dirt from entering engine air intakes. In off highway vehicles, the amount of airborne dirt and dust is great and the operation of engines has been adversely affected due to air cleaner clogging which restricted the flow of combustion air to the engine and by ingestion of dirt and dust from dirty filters into the engines.

Gas turbine engines have been used in some land vehicles and because gas turbine engines require considerably greater amounts of air for operation than do equivalent reciprocating piston engines, air intakes for gas turbine engines have had large flow areas and low air flow impedances. The possibilities of dust and dirt entering these engines, or clogging filters at the intakes are significant because of the greater quantities of air handled by the engines.

Where placement of a gas turbine engine remote from the forward end of the vehicle is desirable from the standpoint of uniform axle load distributions, the problems associated with dust and dirt in the intakes become severe. This is particularly so in off-the-road vehicles where large quantities of airborne dust and dirt are common.

If the combustion air intakes were located adjacent the engine of such a vehicle, the filters would rapidly load up tending to reduce the engine efficiency while increasing the chances of engine damage by ingested particles. Locating the engine at the forward end of the vehicle would reduce the problems arising from dust but would create nonuniform axle load distributions.

Placing the engine centrally in the vehicle with a combustion air duct extending between the forward end and the engine would tend to minimize the dust problem while enabling more uniform axle loadings, but the duct volume required for this approach was large, and available space in the vehicle for such ducting is limited. Furthermore, if the duct itself was not structurally strong, or shielded, it could be punctured or otherwise damaged.

The use of vehicle frame members as ducting was not acceptable because an initially clean passageway could not be guaranteed due to various substances likely to be present in the frame after its fabrication. Further, most frame materials were subject to corrosion so that ducts formed by the frame members could constitute self-contaminating passageways which could not be serviced or maintained with ease.

2. The Prior Art

The prior art has not proposed an off-the-road vehicle having a centrally supported engine and air intake ducting which: Is protected against damage during operation of the vehicle over rough terrain; Occupies minimal, otherwise unused, space in the vehicle; Is readily serviceable; Does not of itself contaminate the intake air; and, In which the ingestion of dust into the engine is minimized.

SUMMARY OF THE INVENTION

The present invention provides a new and improved land vehicle having an air breathing engine centrally located on the vehicle frame near the vehicle center of gravity and wherein clean combustion air is communicated from the forward end of the vehicle to the engine through ducting which coextends with and is supported in and protected by the frame members of the vehicle.

In a preferred embodiment, the vehicle is an off-the-highway type rear dumping truck having four wheel assemblies which support a main frame. The frame includes a pair of longitudinal frame members which converge towards each other at a small acute angle proceeding towards the forward end of the vehicle.

A prime mover including a gas turbine engine is supported substantially at the center of gravity of the vehicle between the forward and rear pairs of truck wheel assemblies and on the center line of the vehicle between the main frame members. Combustion air for the engine is introduced into the engine through a combustion air delivery system extending from engine air intake openings to the forward end of the vehicle to assure that the cleanest available air (i.e. the air at the front of the vehicle) is directed to the engine.

The preferred combustion air delivery system receives air from a single inlet, splits the flow of air through a pair of ducts housed by the main frame members and delivers the air to respective air intakes at opposite sides of the engine. The system includes a plenum chamber at the forward end of the vehicle which houses an air cleaner. The air flowing through the plenum is channeled into one of the ducts.

Each duct is received within a respective main frame member so that the frame member supports the duct and protects the duct from damage. The ducts are constructed from a non-corrosive sheet metal material which can be cleaned out after the ducts are fabricated. The ducts are of rectangular cross sectional shape and are sized to be removable from their respective frame members for inspection and servicing if desired.

The location of the ducts in the otherwise unused space of the frame members effectively increases the space available for other components on the vehicle frame. Assembly of the ducts to the frame members assures adequate support for the ducts.

The rearward ends of the ducts are connected to the engine inlet ports by flexible couplings which enable relative motion between the engine and ducts. In a preferred embodiment, vanes in the ducts guide the flow of air smoothly into the intakes so that turbulence and consequent flow impedance adjacent the intake is avoided.

A principal object of the present invention is the provision of a new and improved land vehicle having an air breathing engine supported remote from the forward end of the vehicle and a combustion air delivery system which communicates air intake openings in the engine with the forward end of the vehicle through ducts which coextend with and are supported and protected by vehicle frame members.

Other objects and advantages of the invention will become apparent from the following detailed description thereof made with reference to the accompanying drawings.

BRIEF DESCRIPTION OF THE DRAWINGS

FIG. 3 is a fragmentary plan view showing a portion of the vehicle illustrated in FIG. 2 and on a scale which is larger than the scale of FIG. 2;

FIG. 4 is a view seen from the plane indicated by the line 4—4 in FIG. 3;

FIG. 5 is an elevational view seen from the plane indicated by the line 5—5 of FIG. 4; and, FIG. 6 is a cross sectional view seen from the plane indicated by the line 6—6 in FIG. 4.

DETAILED DESCRIPTION OF THE INVENTION

Figure 1:
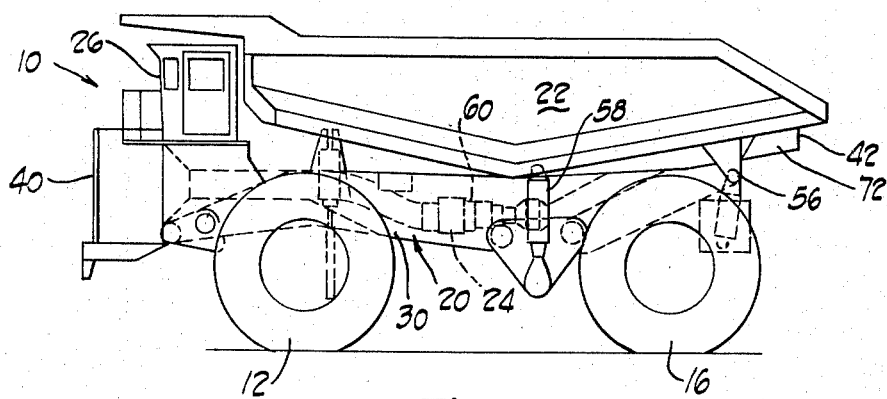
FIG. 1 is a side elevational view of a vehicle embodying the present invention.

A truck 10 embodying the present invention is illustrated in the drawings. The truck 10 includes ground engaging wheel assemblies 12, 14, 16, 18 on which a frame 20 is suspended. The frame 20 supports a dump body 22 which is tiltable on the frame to dump a load supported in the body at the rear of the truck. A prime mover 24 is supported by the frame 20 beneath the dump body 22 and a control section generally designated at 26 is mounted forwardly of the dump body. The control section 26 includes a cab and associated control systems which are not illustrated or described in detail.

The traction and wheel assemblies 12, 14, 16, 18 each have dual ground engaging dirigible tires and each includes an electric motor and transmission for driving the ground engaging tires. Each of the assemblies is independently driven and the front wheel assemblies 12, 14 are steerable. The traction wheel assemblies are generally described in the above-referenced application to Kelley and since the constructional details of the assemblies are not essential to understanding the present invention reference should be made to that application for more detailed information concerning the wheel assemblies.

Figure 2:
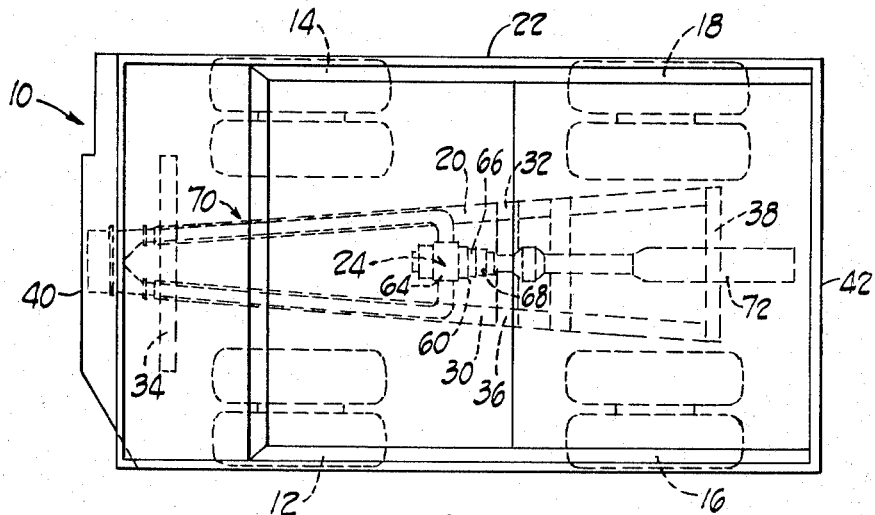
FIG. 2 is a plan view of the vehicle shown in FIG. 1.

The frame 20 is generally wedge-shaped when viewed in plan and includes main frame members 30, 32 which converge towards each other at a small acute angle proceeding forwardly along the vehicle. The frame members 30, 32 are spaced apart by cross braces which extend between them. Cross braces 34, 36, 38 are schematically illustrated in FIG. 2. The cross brace 34 is located at the forward end 40 of the vehicle. The cross brace 38 is located at the rearward end 42 of the vehicle and the cross brace 36 is located substantially intermediate the ends of the vehicle.

Figure 6:
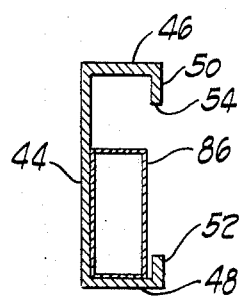

The frame members 30, 32 are each preferably channel-like or box section members (FIG. 6). Each frame member has a generally vertical web 44 and horizontal upper and lower flanges 46, 48 which extend from the web towards the vehicle centerline. Flange lips 50, 52 are formed at the projecting ends of the flanges 46, 48 respectively. The lips extend towards each other so that each frame member is somewhat tubular in that it defines a longitudinal chamber having a longitudinal access opening 54 between the flange lips 50, 52.

The dump body 22 is connected to the frame 20 by a pivot construction 56 at the rear end of the frame. The dump body is tilted between its load carrying position, illustrated in FIG. 1, and a dumping position by hydraulic rams 58 which are connected between the frame and the dump body. A further description of the dump body and its operation is found in the above-referenced application to Vincenty.

The prime mover 24 is supported by the frame substantially at the center of gravity of the truck and remote from the forward end. In the preferred embodiment, the prime mover includes a gas turbine engine 60 which drives an alternator. The alternator forms a power supply for electric motors which drive the vehicle wheel assemblies and power other component systems.

The gas turbine engine includes a compressor section 64, a fuel burner section 66 and a turbine section 68. The constructional details of the engine may be conventional and therefore are not illustrated or described in further detail.

Combustion air is introduced into the compressor section 64 by a combustion air delivery system 70. Exhaust gas is directed from the turbine section 68 through an exhaust system which is generally designated at 72. The exhaust system 72 is described the same as that which is illustrated and described in the above cross-referenced application to Vincenty and that application should be referred to for further detailed description of the system 72.

The system 70 opens at the forward end of the vehicle through an inlet plenum chamber 76. The plenum chamber 76 has an open side 78 which may be covered by a suitable grillwork. An air cleaner 82 is supported in the chamber 76 across the opening 78. The air cleaner may be of any suitable construction and is shown schematically (FIG. 3).

A pair of rearwardly extending ducts 84, 86 extend between the plenum chamber 76 and the compressor section of the engine. The ducts 84, 86 branch from the plenum chamber and extend rearwardly toward the engine. Each duct 84, 86 coextends with a respective frame member 30, 32 and the longitudinal chamber in the respective frame member defines a duct receptacle in which the duct is supported and protected.

As is best seen in FIGS. 3 and 4, the duct 84 includes a connecting flange portion 87 by which the duct is connected to the plenum chamber 76. The cuts 84 is received by the duct supporting receptacle in the channel-like frame member 32 so that the duct extends adjacent the web and is supported by the flange 48 through a portion of its length. As shown in FIG. 6, the duct is substantially rectangular in cross section and has a height which is less than the distance between the lips 50, 52 of the frame member. The duct can thus be inserted and removed from the frame member through the access opening 54 when desired.

A rearward end 88 of the duct 84 defines a right angle bend which extends from the frame member 30 towards the engine. The right angle bend at the end 88 of the duct 84 is provided with a series of vanes 92 which streamline the flow of air around the turn. The duct terminates at a flange 93 which is bolted to a flexible coupling section 94 extending between the flange 93 and an intake port of the engine. The flexible coupling section 94 is preferably constructed from a rubberized material which is transversely corrugated to permit easy flexure and enables relative movement between the duct 84 and the engine without damaging the duct structure.

The construction and arrangement of the duct 86 and associated parts is substantially the same as described above in reference to the duct 84 and accordingly the duct 86 and associated parts are not described in detail. Parts associated with the duct 86 which are similar to the parts described above in reference to the duct 84 are indicated by corresponding reference characters.

Although a single embodiment of the present invention has been illustrated and described in considerable detail, the present invention is not to be considered to be limited to the precise construction shown. Various adaptations, modifications and uses of the invention will become apparent to those skilled in the art and it is intended to cover hereby all such adaptations, modifications and uses which come within the scope of the appended claims.

What is claimed is:

1. In an off-the-highway load hauling vehicle having ground engaging propelling members, a vehicle frame suspended on said ground engaging members and extending longitudinally of said vehicle, and a load receiving body portion:
  a. an air breathing combustion engine supported by said frame remote from a forward end of said vehicle;
  b. said vehicle frame comprising at least one longitudinally extending frame member defined by a web and longitudinally extending flanges which project from a face of said web, said flanges and web defining a longitudinally extending cavity having an access opening defined between projecting sides of said flanges; and,
  c. a combustion air delivery system communicating said engine with air at said forward end of said vehicle;
  d. said delivery system comprising:
    1. structure defining an air inlet opening at said forward end of the vehicle;
    2. at least one duct member for communicating said opening with an air inlet section of said engine; and,
    3. said duct member coextending with a portion of said longitudinally extending vehicle frame member and disposed in said cavity, said duct member supported and protected by said frame member and removable via said access opening.

2. In a vehicle as claimed in claim 1 wherein said projecting sides of said flanges are defined at least in part by longitudinally extending flange lips, the flange lips of each flange extending toward the other flange and said access opening being defined between said flange lips.

3. An off-the-highway load hauling vehicle comprising:
  a. ground engaging propelling members;
  b. a vehicle frame suspended on said ground engaging members and extending longitudinally of said vehicle, said frame being generally wedge-shaped when viewed in plan and comprising first and second longitudinal frame members extending from near the forward end of the vehicle toward the rearward end;
  c. a load receiving body portion;
  d. an air breathing combustion engine supported by said frame remote from a forward end of said vehicle; and,
  e. a combustion air delivery system communicating said engine with air at said forward end of said vehicle;
  f. said delivery system comprising:
    1. structure defining an air inlet opening and an inlet chamber adjacent said forward end of the vehicle;
    2. first and second duct members opening into said chamber for communicating said inlet opening with an air inlet section of said engine; and,
    3. each of said duct members coextending with a respective frame member and supported and protected by said respective frame member.

4. A vehicle as claimed in claim 3 wherein said frame members are of channel-like cross sectional shape and comprise a web and vertically spaced flanges extending from said web, each of said duct members extending adjacent said web and between said flanges of a respective frame member along a portion of the length of said frame member between said inlet chamber and said engine.

5. A vehicle as claimed in claim 3 wherein said duct members are composed of noncorrosive material.

6. A vehicle as claimed in claim 3 wherein said inlet chamber is defined by a plenum structure, and further comprising an inlet air cleaner supported by said plenum structure adjacent the forward end of said vehicle.

7. An automotive vehicle comprising:
  a. a frame comprising at least a pair of frame members extending longitudinally of the vehicle;
  b. a gas turbine engine supported by said frame remote from a forward end of said vehicle;
  c. an intake air delivery system between said engine and the forward end of the vehicle comprising:
    1. at least an intake air duct extending from said forward end of the vehicle to a location adjacent said engine; and,
    2. passage means for communicating said duct with said engine;
  d. at least one frame member defining a longitudinally extending duct receptacle in which said at least one duct is supported and protected, said frame member comprising a box section structural member having a longitudinal access opening for said duct.

8. A vehicle as claimed in claim 7 wherein said passage means is defined by a flexible conduit extending between said engine and said duct.

9. A vehicle as claimed in claim 7 wherein said delivery system further comprises a plenum chamber defining an opening at the forward end of said vehicle and an air filter in said plenum chamber between said duct and said opening.

10. An automotive vehicle comprising:
   a. a vehicle frame comprising at least first and second longitudinally extending frame members;
   b. an engine supported by said frame remote from a forward end of the vehicle;
   c. an engine intake air delivery system for communicating intake air to said engine from a forward end of the vehicle comprising:
      1. structure defining an intake air opening adjacent the forward end of said vehicle; and,
      2. at least one intake air duct communicating with said opening and extending from adjacent the forward end of the vehicle to a location at least adjacent the engine;
   d. at least one of said frame members comprising a generally box section structural member defining a duct member receptacle and having a longitudinally extending access opening, said duct member supported by said at least one frame member within said receptacle throughout a substantial portion of the length of said duct member whereby said duct member is protected by said one frame member yet is accessible via said access opening.

11. A vehicle as claimed in claim 10 wherein the other of said first and second frame members comprises a generally box section structural member defining a duct member receptacle and having a longitudinally extending access opening, and further including a second duct member extending from adjacent the forward end of the vehicle to a location at least adjacent the engine and supported in the duct member receptacle of said other frame member throughout a substantial portion of the length of said second duct member, said structure defining an intake air opening adjacent the forward end of said vehicle providing an intake air chamber adjacent said opening, said duct members opening into said chamber.

* * * * *